United States Patent
Yi

(10) Patent No.: US 11,057,913 B2
(45) Date of Patent: Jul. 6, 2021

(54) METHOD AND APPARATUS FOR REDUCING LATENCY BASED ON PRE-CONFIGURED PHYSICAL UPLINK SHARED CHANNEL IN WIRELESS COMMUNICATION SYSTEM

(71) Applicant: LG Electronics Inc., Seoul (KR)

(72) Inventor: Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 176 days.

(21) Appl. No.: 16/335,763

(22) PCT Filed: Oct. 11, 2017

(86) PCT No.: PCT/KR2017/011183
§ 371 (c)(1),
(2) Date: Mar. 22, 2019

(87) PCT Pub. No.: WO2018/070776
PCT Pub. Date: Apr. 19, 2018

(65) Prior Publication Data
US 2020/0337068 A1 Oct. 22, 2020

Related U.S. Application Data

(60) Provisional application No. 62/406,415, filed on Oct. 11, 2016.

(51) Int. Cl.
*H04W 72/12* (2009.01)
(52) U.S. Cl.
CPC ... *H04W 72/1268* (2013.01); *H04W 72/1289* (2013.01)

(58) Field of Classification Search
CPC ............. H04W 72/1268; H04W 72/04; H04W 72/1289; H04W 74/0808; H04W 72/12;
(Continued)

(56) References Cited

U.S. PATENT DOCUMENTS

2011/0249578 A1* 10/2011 Nayeb Nazar ........ H04L 5/0053
370/252
2012/0300635 A1* 11/2012 Jersenius ............. H04L 1/1887
370/235

(Continued)

FOREIGN PATENT DOCUMENTS

WO 2016053639 4/2016

OTHER PUBLICATIONS

Catt, "Consideration on grant-free transmission," R1-1608757, 3GPP TSG RAN WG1 Meeting #86bis, Lisbon, Portugal, Oct. 1, 2016, see section 1-2; and figure 1.

*Primary Examiner* — Nathan S Taylor
(74) *Attorney, Agent, or Firm* — Dentons US LLP

(57) ABSTRACT

In order to reduce latency in new radio access technology (NR), a method and apparatus for configuring a pre-scheduled physical uplink shared channel (PUSCH) is proposed. A user equipment (UE) receives a configuration of the pre-scheduled PUSCH from a network, wherein the configuration includes a percentage of resource for the pre-scheduled PUSCH, and transmits UL data via the pre-scheduled PUSCH according to the percentage of resource to the network. Further, the UE receives a dynamic indication of adjusting the percentage of resource for the pre-scheduled PUSCH from the network, and transmits UL data via the pre-scheduled PUSCH according to the adjusted percentage of resource to the network.

13 Claims, 8 Drawing Sheets

(58) Field of Classification Search
CPC ... H04L 1/0003; H04L 1/0009; H04L 1/1887; H04L 5/0044; H04L 5/0051; H04L 5/0094; H04L 1/00; H04L 5/00
USPC .......................................... 370/329
See application file for complete search history.

(56) References Cited

U.S. PATENT DOCUMENTS

| | | | |
|---|---|---|---|
| 2014/0254544 A1* | 9/2014 | Kar Kin Au | H04L 27/2613 370/330 |
| 2015/0124663 A1* | 5/2015 | Chen | H04L 5/0073 370/278 |
| 2015/0181589 A1* | 6/2015 | Luo | H04L 5/0048 370/329 |
| 2015/0188690 A1* | 7/2015 | Khoryaev | H04L 65/1006 370/280 |
| 2015/0237649 A1* | 8/2015 | Zhang | H04W 72/0446 370/329 |
| 2016/0100430 A1* | 4/2016 | Dabeer | H04W 74/08 370/329 |
| 2016/0150545 A1* | 5/2016 | Tayloe | H04L 1/001 370/329 |
| 2016/0183309 A1* | 6/2016 | Zhang | H04W 74/002 370/329 |
| 2016/0242054 A1* | 8/2016 | Lee | H04L 5/0048 |
| 2016/0316388 A1* | 10/2016 | Rosen | H04W 28/0231 |
| 2017/0078974 A1* | 3/2017 | Koutsimanis | H04W 52/146 |
| 2017/0237592 A1* | 8/2017 | Yang | H04L 27/2614 375/260 |
| 2018/0263062 A1* | 9/2018 | Lee | H04W 72/1284 |
| 2020/0337068 A1* | 10/2020 | Yi | H04L 1/0003 |

* cited by examiner

METHOD AND APPARATUS FOR REDUCING LATENCY BASED ON PRE-CONFIGURED PHYSICAL UPLINK SHARED CHANNEL IN WIRELESS COMMUNICATION SYSTEM

CROSS-REFERENCE TO RELATED APPLICATIONS

This application is the National Stage filing under 35 U.S.C. 371 of International Application No. PCT/KR2017/011183, filed on Oct. 11, 2017, which claims the benefit of U.S. Provisional Application No. 62/406,415 filed on Oct. 11, 2016, the contents of which are all hereby incorporated by reference herein in their entirety.

BACKGROUND OF THE INVENTION

Field of the Invention

The present invention relates to wireless communications, and more particularly, to a method and apparatus for reducing latency based on a pre-configured physical uplink shared channel (PUSCH) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultra-reliable and low latency communication (URLLC) is discussed. This new technology may be called new radio access technology (new RAT or NR) for convenience.

In NR, analog beamforming may be introduced. In case of millimeter wave (mmW), the wavelength is shortened so that a plurality of antennas can be installed in the same area. For example, in the 30 GHz band, a total of 100 antenna elements can be installed in a 2-dimension array of 0.5 lambda (wavelength) intervals on a panel of 5 by 5 cm with a wavelength of 1 cm. Therefore, in mmW, multiple antenna elements can be used to increase the beamforming gain to increase the coverage or increase the throughput.

In this case, if a transceiver unit (TXRU) is provided so that transmission power and phase can be adjusted for each antenna element, independent beamforming is possible for each frequency resource. However, installing a TXRU on all 100 antenna elements has a problem in terms of cost effectiveness. Therefore, a method of mapping a plurality of antenna elements to one TXRU and adjusting the direction of a beam using an analog phase shifter is considered. This analog beamforming method has a disadvantage that it cannot perform frequency selective beaming because it can make only one beam direction in all bands.

A hybrid beamforming with B TXRUs, which is an intermediate form of digital beamforming and analog beamforming, and fewer than Q antenna elements, can be considered. In this case, although there is a difference depending on the connection method of the B TXRU and Q antenna elements, the direction of the beam that can be simultaneously transmitted is limited to B or less.

For operating NR efficiently, various schemes have been discussed.

SUMMARY OF THE INVENTION

The present provides a method and apparatus for reducing latency based on a pre-configured physical uplink shared channel (PUSCH) in a wireless communication system. The present invention discusses mechanisms to reduce uplink transmission latency, particularly for small sized packets which may occur infrequently but require extremely low latency.

In an aspect, a method for configuring a pre-scheduled physical uplink shared channel (PUSCH) by a user equipment (UE) in a wireless communication system is provided. The method includes receiving a configuration of the pre-scheduled PUSCH from a network, wherein the configuration includes a percentage of resource for the pre-scheduled PUSCH, transmitting UL data via the pre-scheduled PUSCH according to the percentage of resource to the network, receiving a dynamic indication of adjusting the percentage of resource for the pre-scheduled PUSCH from the network, and transmitting UL data via the pre-scheduled PUSCH according to the adjusted percentage of resource to the network.

In another aspect, a user equipment (UE) in a wireless communication system is provided. The UE includes a memory, a transceiver, and a processor, coupled to the memory and the transceiver, that controls the transceiver to receive a configuration of a pre-scheduled physical uplink shared channel (PUSCH) from a network, wherein the configuration includes a percentage of resource for the pre-scheduled PUSCH, controls the transceiver to transmit UL data via the pre-scheduled PUSCH according to the percentage of resource to the network, controls the transceiver to receive a dynamic indication of adjusting the percentage of resource for the pre-scheduled PUSCH from the network, and controls the transceiver to transmit UL data via the pre-scheduled PUSCH according to the adjusted percentage of resource to the network.

Uplink transmission can be performed with extremely low latency.

DESCRIPTION OF EXEMPLARY EMBODIMENTS

Figure 1:
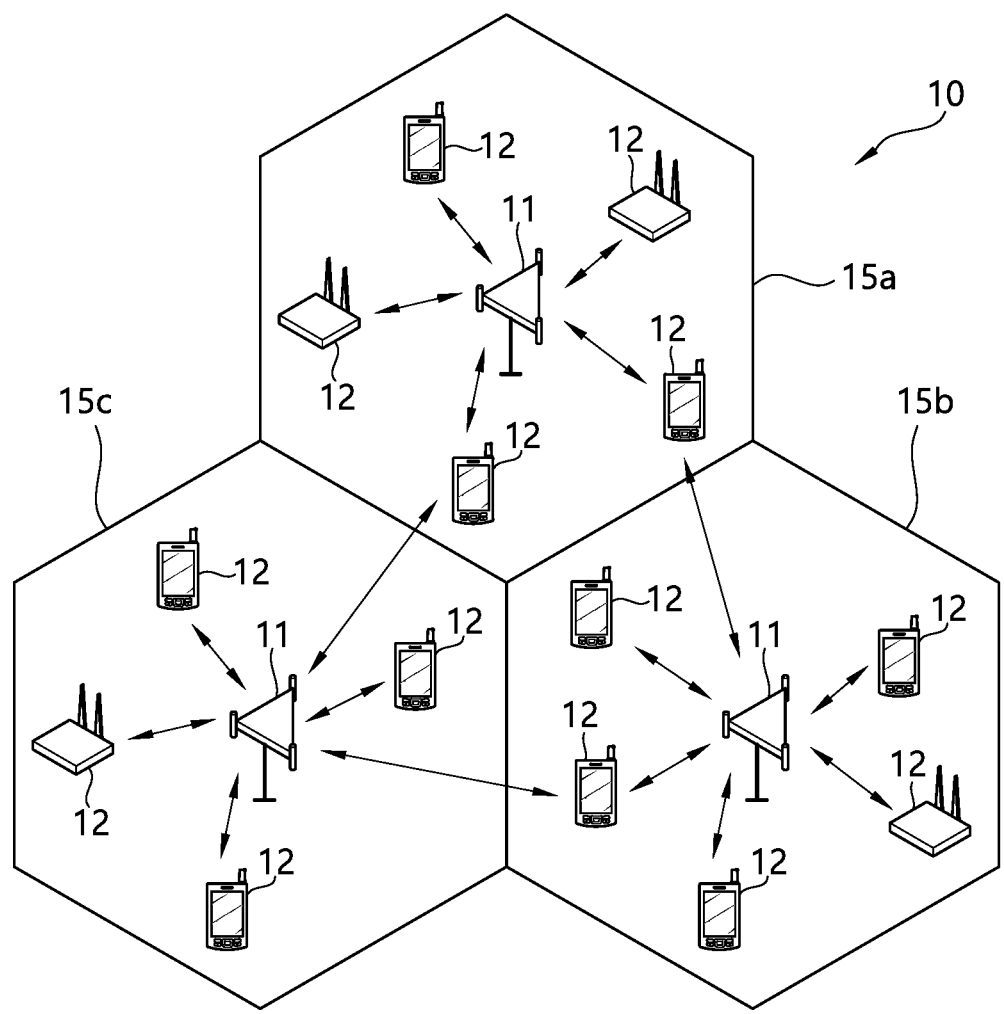
FIG. 1 shows a 3GPP LTE system.

FIG. 1 shows a 3GPP LTE system. The 3rd generation partnership project (3GPP) long-term evolution (LTE) system 10 includes at least one eNodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
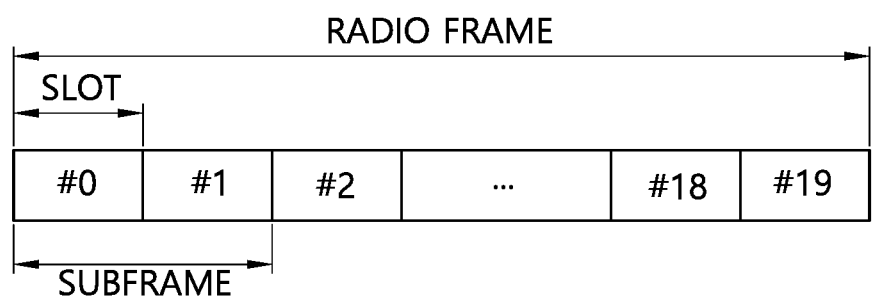
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one transport block by higher layer to physical layer (generally over one subframe) is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes. In a TDD system, to allow fast switching between DL and UL, UL and DL transmission may be performed within a same subframe/slot in time division multiplexing (TDM)/frequency division multiplexing (FDM) manner.

Figure 3:
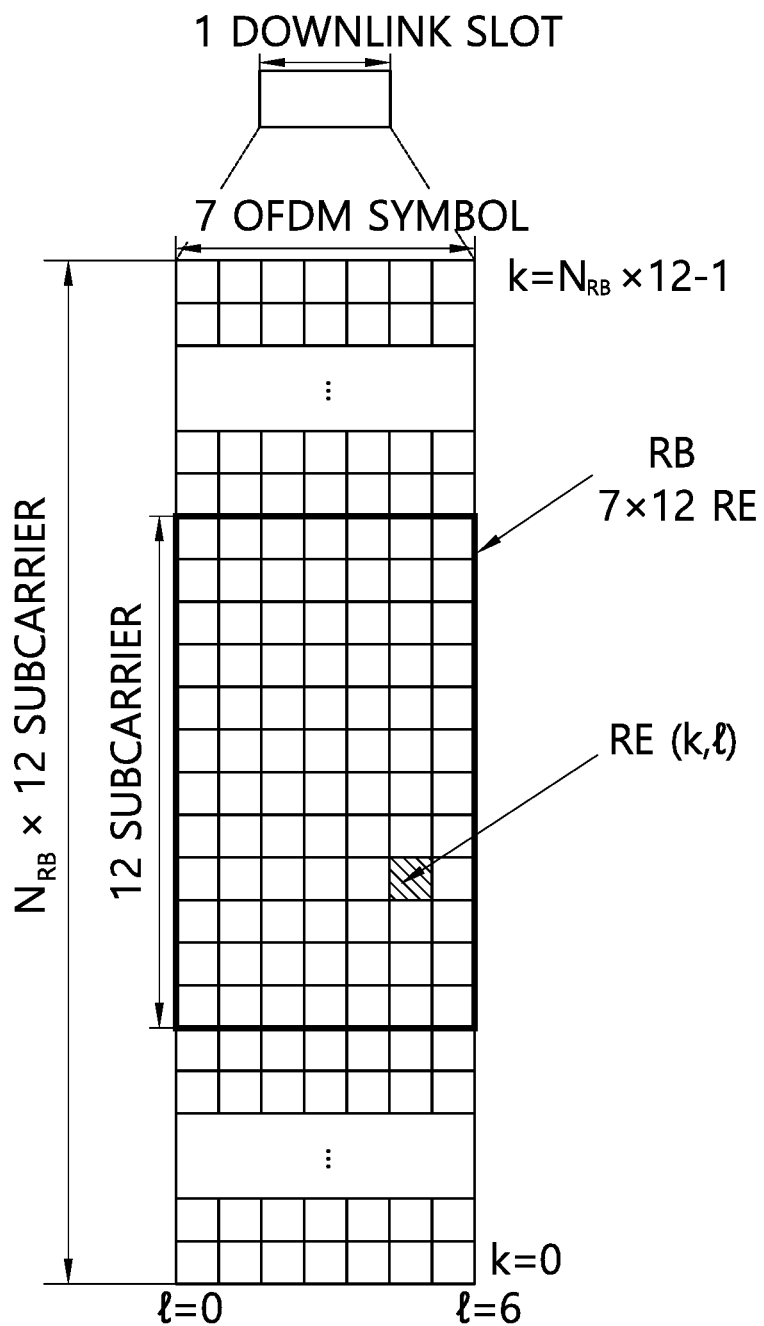
FIG. 3 shows a resource grid for one downlink slot.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 or 12×14 resource elements. The number NDL of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7 or 14, and in case of an extended CP, the number of OFDM symbols is 6 or 12. One of 128, 256, 512, 1024, 1536, 2048, 4096 and 8192 may be selectively used as the number of subcarriers in one OFDM symbol.

5th generation mobile networks or 5th generation wireless systems, abbreviated 5G, are the proposed next telecommunications standards beyond the current 4G LTE/international mobile telecommunications (IMT)-dvanced standards. 5G includes both new radio access technology (new RAT or NR) and LTE evolution. Hereinafter, among 5G, NR will be focused. 5G planning aims at higher capacity than current 4G LTE, allowing a higher density of mobile broadband users, and supporting device-to-device, ultra-reliable, and massive machine communications. 5G research and development also aims at lower latency than 4G equipment and lower battery consumption, for better implementation of the Internet of things.

NR may use the OFDM transmission scheme or a similar transmission scheme. NR may follow the existing LTE/LTE-A numerology, or may follow the different numerology from the existing LTE/LTE-A numerology. Table 1 below shows an example of OFDM numerology in NR. NR may have a larger system bandwidth (e.g. 100 MHz). Or, one cell may support multiple numerologies in NR. That is, UEs operating in different numerologies may coexist within one cell in NR.

TABLE 1

| Parameter | Value |
|---|---|
| Subcarrier-spacing (Δf) | 75 kHz |
| OFDM symbol length | 13.33 us |
| CP length | 1.04 us/0/94 us |
| System bandwidth | 100 MHz |
| Number of available subcarriers | 1200 |
| Subframe length | 0.2 ms |
| Number of OFDM symbol per Subframe | 14 symbols |

It is expected that different frame structure may be necessary for NR. Particularly, different frame structure in which UL and DL may be present in every subframe or may change very frequently in the same carrier may be necessary for NR. Different application may require different minimum size of DL or UL portions to support different latency and coverage requirements. For example, massive machine-type communication (mMTC) for high coverage case may require relatively long DL and UL portion so that one transmission can be successfully transmitted. Furthermore, due to different requirement on synchronization and tracking accuracy requirements, different subcarrier spacing and/or different CP length may be considered. In this sense, it is necessary to consider mechanisms to allow different frame structures coexisting in the same carrier and be operated by the same cell/eNB.

In NR, utilizing a subframe in which downlink and uplink are contained may be considered. This scheme may be applied for paired spectrum and unpaired spectrum. The paired spectrum means that one carrier consists of two carriers. For example, in the paired spectrum, the one carrier may include a DL carrier and an UL carrier, which are paired with each other. In the paired spectrum, communication, such as DL, UL, device-to-device communication, and/or relay communication, may be performed by utilizing the paired spectrum. The unpaired spectrum means that that one carrier consists of only one carrier, like the current 4G LTE. In the unpaired spectrum, communication, such as DL, UL, device-to-device communication, and/or relay communication, may be performed in the unpaired spectrum.

Further, in NR, the following subframe types may be considered to support the paired spectrum and the unpaired spectrum mentioned above.

(1) Subframes including DL control and DL data
(2) Subframes including DL control, DL data, and UL control
(3) Subframes including DL control and UL data
(4) Subframes including DL control, UL data, and UL control
(5) Subframes including access signals or random access signals or other purposes.
(6) Subframes including both DL/UL and all UL signals.

However, the subframe types listed above are only exemplary, and other subframe types may also be considered.

Figure 4:
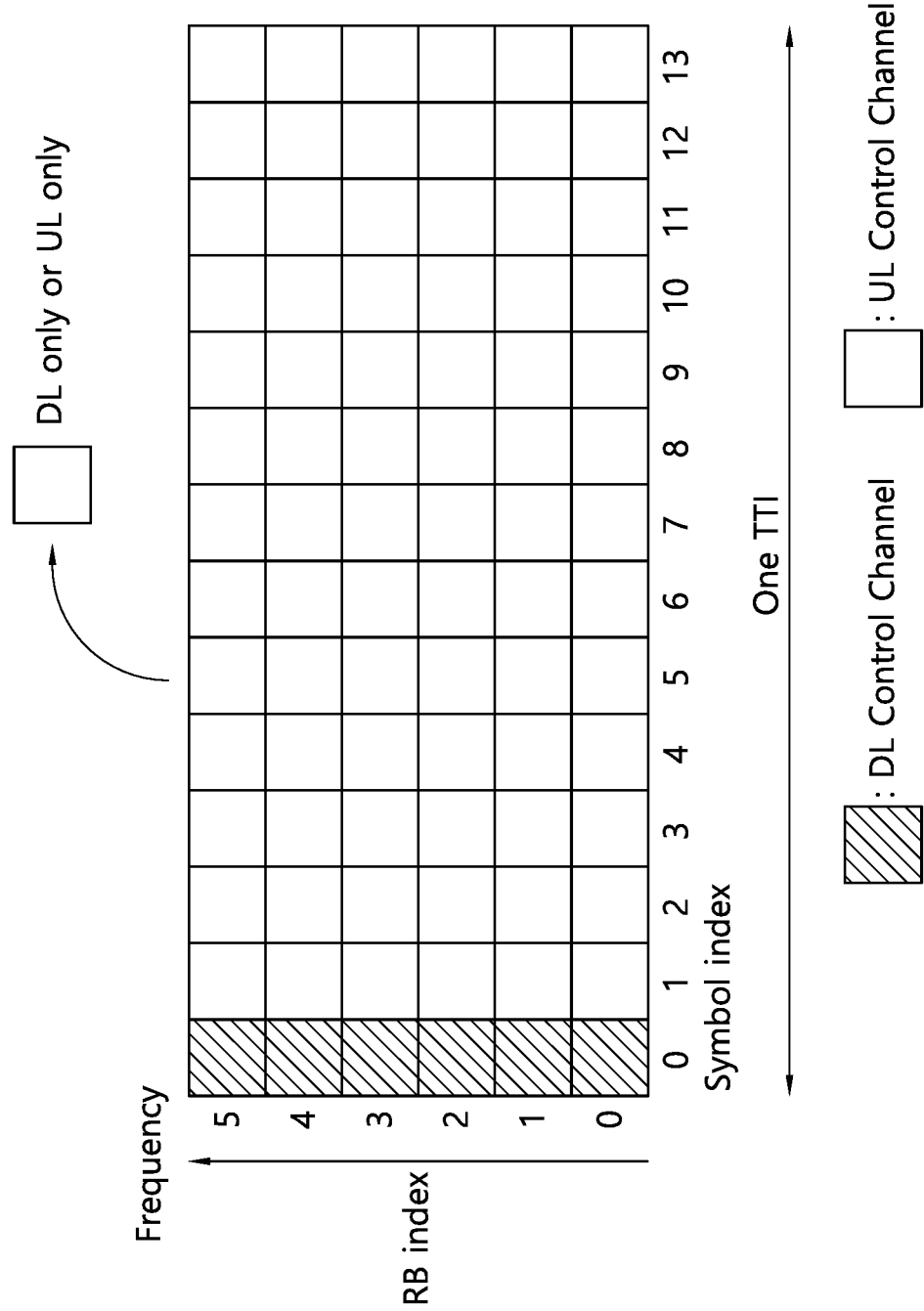
FIG. 4 shows an example of subframe type for NR.

FIG. 4 shows an example of subframe type for NR. The subframe shown in FIG. 4 may be used in TDD system of NR, in order to minimize latency of data transmission. Referring to FIG. 4, the subframe contains 14 symbols in one TTI, like the current subframe. However, the subframe includes DL control channel in the first symbol, and UL control channel in the last symbol. A region for DL control channel indicates a transmission area of a physical downlink control channel (PDCCH) for Downlink control information (DCI) transmission, and a region for UL control channel indicates a transmission area of a physical uplink control channel (PUCCH) for uplink control information (UCI) transmission. Here, the control information transmitted by the eNB to the UE through the DCI may include information on the cell configuration that the UE should know, DL specific information such as DL scheduling, and UL specific information such as UL grant. Also, the control information transmitted by the UE to the eNB through the UCI may include a hybrid automatic repeat request (HARQ) acknowledgement/non-acknowledgement (ACK/NACK) report for the DL data, a channel state information (CSI) report on the DL channel status, and a scheduling request (SR). The remaining symbols may be used for DL data transmission (e.g. physical downlink shared channel (PDSCH)) or for UL data transmission (e.g. physical uplink shared channel (PUSCH)).

According to this subframe structure, DL transmission and UL transmission may sequentially proceed in one subframe. Accordingly, DL data may be transmitted in the subframe, and UL acknowledgement/non-acknowledgement (ACK/NACK) may also be received in the subframe. In this manner, the subframe shown in FIG. 4 may be referred to as self-contained subframe. As a result, it may take less time to retransmit data when a data transmission error occurs, thereby minimizing the latency of final data transmission. In the self-contained subframe structure, a time gap may be required for the transition process from the transmission mode to the reception mode or from the reception mode to the transmission mode. For this purpose, some OFDM symbols at the time of switching from DL to UL in the subframe structure may be set to the guard period (GP).

Figure 5:
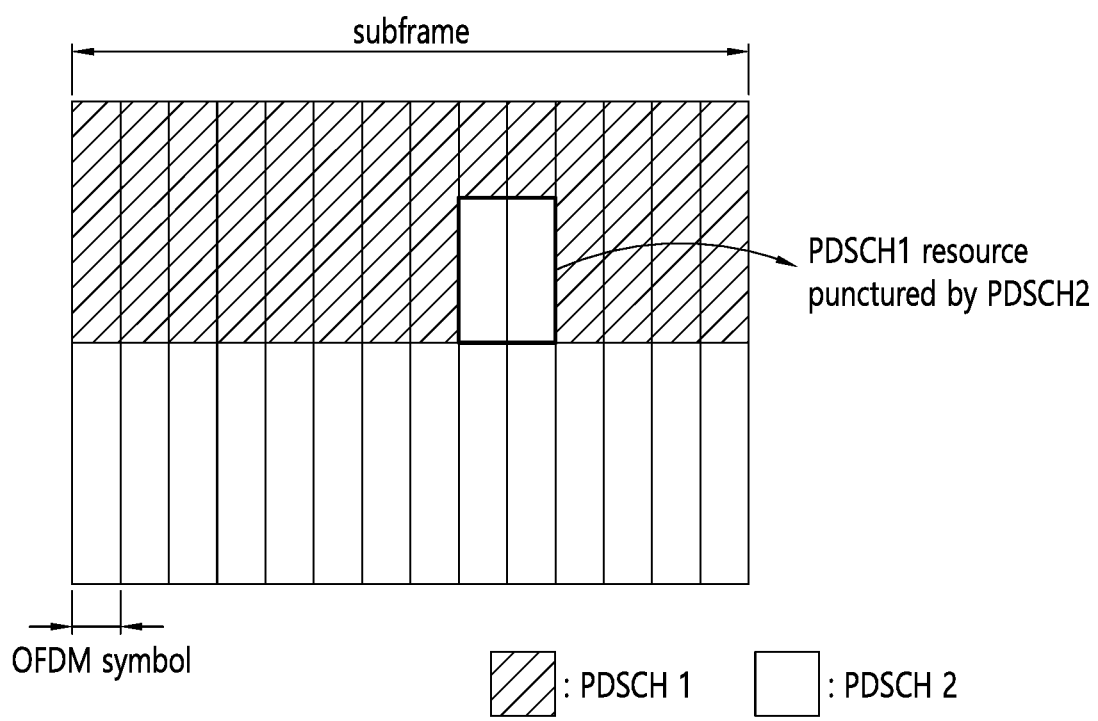
FIG. 5 shows an example of transmission of two data with different latency requirement.

FIG. 5 shows an example of transmission of two data with different latency requirement. If data with higher importance of latency (e.g. ultra-reliable low-latency communication (URLLC) data) and data with relatively lower importance of latency (e.g. enhanced mobile broadband (eMBB) data) can be multiplexed and transmitted on the same frequency resources of the same cell, collision of transmission resources between two data may occur. Since transmission of data in which latency is important is prioritized generally, referring to FIG. 5, the data with higher importance of latency (PDSCH 2) may be transmitted by puncturing resources for the data with lower importance of latency (PDSCH 1). In this case, the data with lower importance of latency (PDSCH 1) is generally transmitted with a longer TTI length than the data with higher importance of latency (PDSCH 2), so that some OFDM symbols of the data with lower importance of latency (PDSCH 1) is punctured for transmission of the data with higher importance of latency (PDSCH 2). In this case, data of which some resource is punctured experiences interference in the corresponding resource, resulting in a large performance degradation. In the present invention, for convenience of description, a channel through which DL data is transmitted is referred to as a PDSCH, and a channel through which UL data is transmitted is referred to as a PUSCH.

Additionally, when the network operates in half-duplex (i.e. perform only DL or UL at a time), it is necessary to consider how to support multiplexing of URLLC UL and eMBB DL (or, URLLC UL and eMBB DL). Also, to reduce the latency, it is necessary to consider that a UE can initiate UL transmission, at least for the first transmission which needs otherwise scheduling request (SR) transmission in a pre-configured resource with contention based approach. In other words, it is necessary to consider that the network may configure some resources in advance so that the UE can start UL transmission in such resources without receiving UL grant in prior.

Hereinafter, a method for reducing latency based on a pre-configured PUSCH is proposed according to the present invention. To reduce the latency, the present invention considers different steps/procedures which may lead different configurations and different latency. Hereinafter, the present invention will be described based on NR for convenience of description. However, the scope of the system to which the present invention is applied can be expanded to other systems such as 3GPP LTE/LTE-A system, in addition to NR.

1. Pre-Scheduled PUSCH Configuration Based Approach.

In current LTE, when UL traffic occurs, the UE first transmits SR and/or buffer status report (BSR) for scheduling request. As the UE has to transmit SR and/or BSR before transmitting PUSCH, the latency is generally large. To reduce the latency, the resources for SR transmission and/or BSR transmission may be pre-configured. To further reduce the latency, PUSCH may be transmitted right away (i.e. without SR and/or BSR).

By the pre-scheduled PUSCH configuration based approach, the pre-scheduled PUSCH configuration may be transmitted periodically by the network. The network may transmit the pre-scheduled PUSCH configuration via broadcast or group-cast or unicast. The UE may transmit UL data via the pre-scheduled PUSCH with contention. The pre-scheduled PUSCH configuration may include at least one of the followings:

RB allocation

One or a set of demodulation reference signal (DM-RS) sequences used for transmission (if multiple DM-RS candidates are indicated, a UE may select the sequence randomly or by a specific rule(s))

One or a set of modulation and coding scheme (MCS) (if multiple MCSs are indicated, a UE may select the closest MCS which can satisfy the channel condition)

Other configuration

Further, the pre-scheduled PUSCH configuration may include a percentage of available resource for grant-free PUSCH scheduling (i.e. pre-scheduled PUSCH). The resource may be initially configured in a semi-static manner, and the total amount of resource may be dynamically adjusted by dynamic indication via higher layer signaling. Dynamic indication may include percentage, which may increase or decrease the configured resource. In terms of resource determination, if the dynamic indication indicates decreasing of the configured resource, the lowest or highest PRBs may be selected. If the dynamic indication indicates increasing of the configured resource, additional resource may be selected after the last configured resource. In resource adjustment, not only frequency domain resource but also time domain resource may also be increased/decreased. That is, the resource may be configured jointly between time and frequency.

Alternatively, the pre-scheduled PUSCH configuration may be transmitted by utilizing a random access response (RAR) without associated physical random access channel (PRACH). A preamble index may be assigned for each group of UEs performing the contention in the same resource pool. With the RAR, each UE may acquire resource pool where transmission can occur. Alternatively, SR may be transmitted in a PRACH format, i.e. contention based transmission. The RAR may include preambles which were successfully received. The UEs of which preamble is successfully transmitted (i.e. responded with the RAR) may transmit PUSCH in the configured resource. PRACH format used for SR may be a small packet assuming that synchronization with the network is maintained. One example of short PRACH format may be to use Zadoff-Chu (ZC) sequence, similar to DM-RS. Further, separate resource configuration from regular PRACH procedure may be used for the pre-scheduled PUSCH.

In terms of timing of the pre-scheduled PUSCH configuration, the pre-scheduled PUSCH configuration may be transmitted at least K TTI before actual resource can be used (e.g. K=8). To use the pre-scheduled PUSCH, the following options may be considered.

(1) Option 1: The UE may transmit PUSCH in the pre-scheduled resource with contention based access. Contention may occur between UEs, and the network may not utilize the pre-scheduled resource for scheduling other UE(s), or the network may indicate the remained resource not scheduled (or intended) for other UEs.

(2) Option 2: The may transmit PUSCH in the pre-scheduled resource, only if the pre-scheduled resource is free by sensing. As the network may schedule the resource to other UEs, the UE may first perform sensing on the resource. The UE using the resource by scheduling may have higher priority. To give higher priority, the UE may use "timing advance (TA)+offset" for contention-based access, and the offset allows sensing latency. The offset may be pre-configured or configured by higher layer or indicated by DCI for pre-scheduled resource configuration.

(3) Option 3: The UE may transmit PUSCH in the pre-scheduled resource, only if the UE receives confirmation from the network as a response to the SR. To support this, the UE first needs to transmit SR transmission. While transmitting the SR, the UE may start preparation on PUSCH so that PUSCH can be transmitted immediately after receiving confirmation from the network. The network may indicate status of the resource, i.e. "clean" or "collision/dirty", in the confirmation. The clean status means that the network has not scheduled the resource to anyone, nor the network has not received any request to utilize the resource which can collide. In this case, different DM-RS and orthogonal cover code (OCC) (or non-orthogonal multiple access (NOMA) mechanism) may be used for multiple UE transmission which are not considered as collision, as long as the network can perform cancellation. Or, the network may indicate collision if any possible collision including NOMA access can occur, i.e. non-orthogonal access on the resource.

The UE may use aggressive power, i.e. increase transmit power with some offset value. The offset value may be indicated semi-statically or dynamically. Or, the offset value may be fixed or determined based on dirty level of the resource if dirty level of the resource is indicated. Alternatively, the UE may adapt its MCS if the dirty indication is given so that the UE may increase the possibility of cancellation. The MCS may need to be informed to the network via PUSCH or via additional UCI transmission in conjunction with PUSCH. Or, the MCS may be jointly transmitted with PUSCH. Alternatively, in addition to the status of the resource ("clean" or "dirty"), the network may also indicate the desired power or power offset in the confirmation which needs to be used by the UE for transmission. Once the UE receives the confirmation from the network, the UE can transmit PUSCH immediately, even in the same TTI (e.g. self-contained PUSCH between confirmation and to PUSCH transmission).

Dynamic indication described above according to the present invention helps to cope with difficulty to configure periodic resource. In transmitting resource configuration, resource location in time/frequency may also be configured.

When group-cast or broadcast resources are used, each resource may be selected by the UE, following resource selection according to shared resource. For example, the UE may select resource by one of random selection, predefined rule, or following preconfigured resource configuration, and adapt the parameters accordingly for the available resources. More specifically, a UE may be configured with resource index, and the resource corresponding to (resource index % maximum resource index) may be selected for PUSCH transmission. If resource index is assigned, separate UE ID may not be carried in data. Resource index may be dedicated to each UE to avoid possible collision when there is sufficient resource for all UEs. Alternatively, UE ID, e.g. cell radio network temporary identifier (C-RNTI) may be used for selecting resource. In other words, the transmission or selection of resource may not be based on contention, rather based on dedicated resource determination.

Even though the resource determination is done per UE-dedicated manner, due to insufficient resource, collisions among UEs may occur. The collision may be avoided by assigning different priority to different UEs. Some examples of priority assignments are as follows.

(1) Based on resource index or C-RNTI: The UE may determine its priority by resource index. If resource index<=maximum resource index, it is considered that the highest priority is assigned to the corresponding UE. The priority increases with resource index/maximum resource index. Additional C-RNTI or RNTI may be assigned for resource allocation purpose.

(2) Explicit indication/configuration of priority: The UE may be explicitly configured with the priority. It may be configured via group configuration and priority may be assigned to each group.

The mechanism describe above may be applied to semi-static configuration of pre-scheduled PUSCH resource. In other words, rather than broadcast or group case dynamic signaling, semi-static configuration may also be considered. Further, similar concept may also be applied to semi-persistent scheduling (SPS resource. The SPS resource may be configured semi-statically or dynamically according to the present invention described above. Following option (3) described above, the UE may activate the resource, and the network may schedule the resource to other UEs for the resources which are not activated by UE(s). The UE may release the resource via SR or SR-like transmission. Once activation is done, periodic resource may be used by the UE in an orthogonal manner until release indication is transmitted.

Difference of semi-static pre-scheduled PUSCH resource is that the network may indicate the status of the configured resource (i.e. "clean" or "dirty") periodically. This is to minimize resource waste. If the network has already scheduled the resource to other UE(s) or intends to schedule, the network may indicate dirty on the resource so that the UE can make the decision properly. To enhance the reliability, the UE may select the resource only if clean indication is given for the resource within [n−K, n] TTI. K may be, e.g. 8, and n is the TTI for the transmission. Or, the UE may select the resource based on the latest indication.

In semi-static configuration, the configured resource may be dedicated to a UE (i.e. orthogonal resource per UE) as long as the network yields the resource to other UE(s) via dynamic scheduling. Thus, with this approach, the network may know which UE(s) would contend on the resource if collision case occurs. Further, when the network yields the resource to other UE(s), the network may allocate different DM-RS (orthogonal DM-RS sequence/resource) so that the network can detect colliding UEs. Furthermore, OCC on the data for MU-MIMO may be further considered, which are up to the network and may not be treated as collision in such cases.

Alternatively, combining SR and contention may be considered. For contention-based or pre-scheduled PUSCH, two resources are configured, one of which is for SR transmission, and the other is for actual data transmission. For SR transmission (which may be transmitted only when positive SR occurs), DM-RS transmission may be used. For SR/PUSCH resource, the same RB may be assumed, or at least SR resource may be the superset of PUSCH resource in frequency domain. SR resource (or DM-RS parameter) may be determined UE-orthogonally (i.e. pre-configured by the network per UE) or UE randomly or by specific rule(s). In case of random selection, it may be difficult to identify any UE. Thus, dedicated resource, or at least DM-RS resource may be selected based on UE ID.

Once the confirmation is given by the network or ACK is received from the network (which is transmitted immediately), the UE may transmit PUSCH in the next resource. ACK or confirmation may not be received during a certain window [n, n+w], where n is the TTI transmitted DM-RS/SR, and w is number of TTI for waiting the response. For better reliability, in addition to utilizing this resource, additional SR trigger may be performed. The gap between SR and PUSCH may be at least m TTI, where m may be e.g. 2. If NACK is received, i.e. the case where the network detects DM-RS, but the resource has been used by other UE(s), the network may initiate UL grant immediately. For the UL grant, the same configuration other than time resource may be used so that the UE may not need to encode data again. If encoding is necessary, different timing for PUSCH may be used and the timing between UL grant to PUSCH may be dynamically indicated in UL grant, or implicitly determined. For example, for the same RB, MCS, etc., immediate timing may be used. And for different RB, MCS configuration UL grant, regular UL grant timing may be used. Alternatively, the UL grant may include the flag to indicate whether the same configuration is used to the pre-scheduled PUSCH configuration or not. As the UL grant can be transmitted anytime, the UE may prepare N PUSCH based on pre-scheduled PUSCH configuration.

In other words, a UE may be pre-configured with only RB, MCS, etc., which are needed for data encoding. Assuming that P is the required TTI between UL grant and PUSCH transmission for regular UL grant, the UE may prepare up to P PUSCH based on the pre-configured parameters. Based on the indication in the UL grant (same as pre-configuration), the UE may transmit one of prepare P PUSCHs at the earliest UL resource. In other words, rather than pre-configuration of resource, pre-configuration of parameter may be considered for fast UL transmission. Pre-configuration of scheduling information (which may be considered as SPS configuration) may be dynamically changed/configured.

Alternatively, very short period SPS configuration may be configured, and SPS activation may occur by the network without changing MCS/RB. Therefore, the UE can immediately transmit the prepared PUSCH. For redundant version (RV), very little timing is necessary to change RV. Even though RV changes, the latency may increase by 1 III (or Q TTIs or a few symbols).

Figure 6:
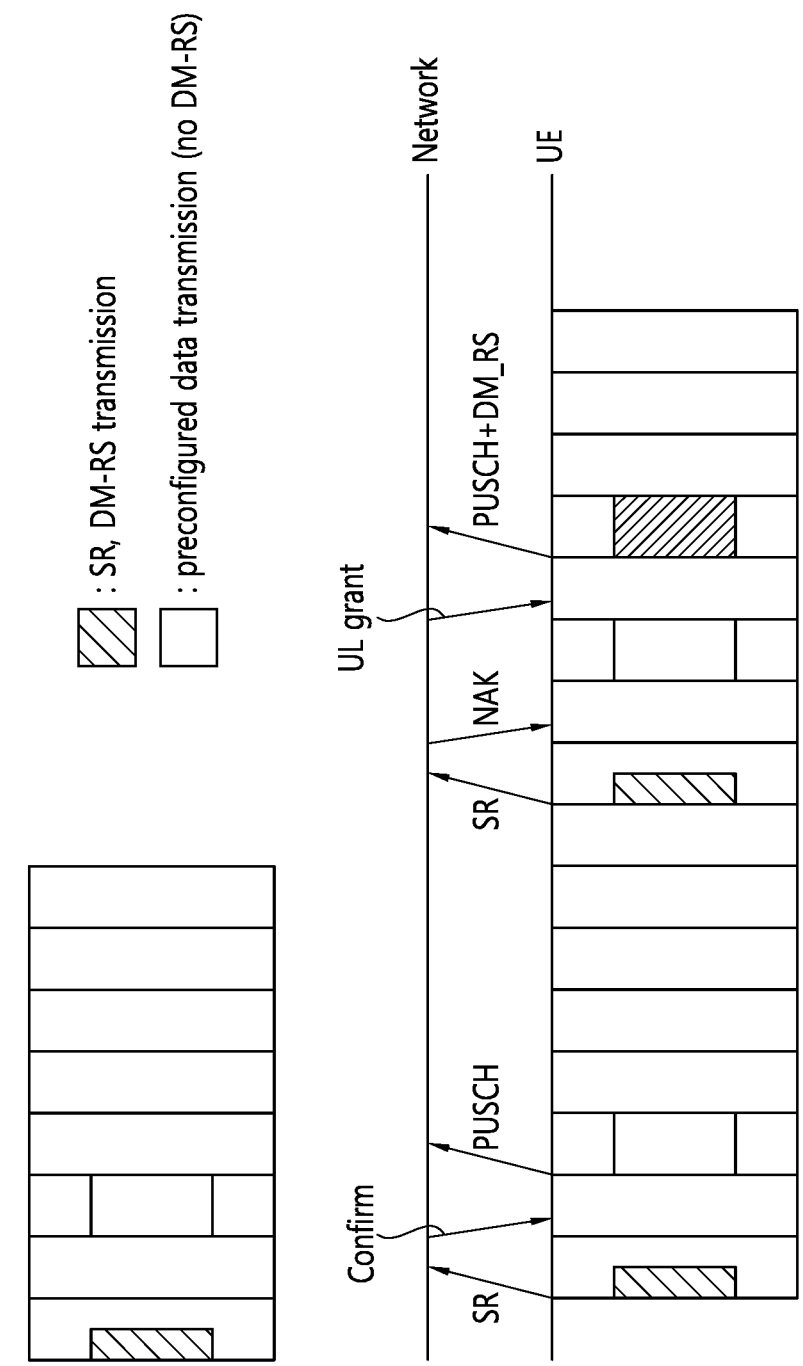
FIG. 6 shows an example of PUSCH transmission procedure according to an embodiment of the present invention.

FIG. 6 shows an example of PUSCH transmission procedure according to an embodiment of the present invention. Referring to FIG. 6, SR (or DM-RS) transmission is configured, and the pre-scheduled PUSCH (without DM-RS) is configured following the SR (or DM-RS). Upon receiving the confirmation from the network as a response to the SR, the UE immediately transmits PUSCH. If NACK is received as a response to the SR, the UL grant is received from the network, and the UE transmits PUSCH (with DM-RS) according to the UL grant.

When SR is transmitted, the following options may be considered for SR design.

(1) DM-RS: As mentioned above, DM-RS may be used for SR transmission. Different frequency/time/code resource may be allocated to each UE. A SR region, which is semi-statically configured and may be rate matched by other transmission, may include multiple SR resources, and each UE may be indicated with dedicated SR resource via higher layer signaling. If only DM-RS is transmitted, one PRB (with one OFDM symbol transmission) may contain DM-RS sequence rather than a few RE (similar to LTE DM-RS sequence). To enhance power spectral density (PSD), one RB may be used for DM-RS transmission.

(2) PRACH: Short-length PRACH may also be used for SR transmission. If necessary, longer sequence length may be considered to allow high multiplexing capacity. For far-UEs, longer PRACH format in time-domain (i.e. span more OFDM symbols or longer duration) may be considered for energy accumulation.

(3) Channel like PUCCH format 1a/2a: One or two bits may be added to SR transmission which may represent change of MCS (compared to semi-statically configured resource) or change of transport block size (TBS), or change of RV, etc. One channel may occupy one or multiple PRBs with single OFDM symbol for at least UEs in center. For far-UEs, more OFDM symbols may be considered.

If a set of UEs perform this type of operation, resource sharing with other UEs may be done by the following options.

(1) Dynamic resource sharing: Resource not used for low latency UEs may be used for other UEs. The resource, which has not been confirmed by the network either via explicit confirm in an UE-specific manner or implicit manner via resource allocation for low latency UEs, may be used for other UEs. As other UEs may use longer TTI length compared to low latency UEs via larger slot size and/or slot aggregation, it may be necessary to support indication mechanisms to other UEs whether the resource can be used or should not be used. For DL, it may be done via searching DM-RS which may be transmitted in every TTI of low latency UEs or in the configured TTI (small TTI length) for resource sharing by higher layer or cell-specific signaling. For UL, similar approach may be considered or semi-static resource partitioning may be considered. Via MU-MIMO, resource collision between UEs with different service requirements may also be considered. Alternatively, the resources which may be used by low latency UEs may also be indicated to non-low latency UEs, and confirm message may be broadcasted to all UEs so that the UE can assume that data will be punctured or rate matched in the configured resource for the given UE.

(2) Semi-static resource sharing (3) Prioritizing on-going transmission: For the lower priority transmission, the UE wait for the next available resource. Or, the UE may wait for the next TTI. Or, the UE may transmit at the indicated resource by NACK or negative confirm message.

(4) Prioritizing transmission of Low latency UEs: For DL, low latency data may puncture other UEs' transmission. For UL, as it may not be able to preempt (unless receiver beam is used or some other isolation mechanism is used), low latency UEs may use higher power or perform MU-MIMO with other UEs' transmission.

2. Pre-Scheduled PUSCH Resource with Contention+Sensing Based Contention

This approach corresponds to pre-scheduled PUSCH (contention resource)+listen-before-talk (LBT). The motivation of this approach is that in order to prevent collision of pre-scheduled PUSCH resource, sensing may be performed before transmission (i.e. sensing on resource selected by itself). Specifically, each sensing parameter, such as backoff window, minimum sensing, sensing threshold, etc., may be set differently according to latency requirement.

3. Contention-Based Access+Backup SR Triggered UL Grant

This approach corresponds to concurrent transmission (not necessary at the same slot) of pre-scheduled PUSCH (contention resource)+SR. The motivation of this approach is that a UL grant for retransmission is pre-acquired via SR to compensate for the shortcomings of waiting for grant free collision. In order to increase diversity and reliability, the same data may be transmitted in the same way. Specifically, after transmission of contention resource, UL grant may be requested via SR. In case of collision indication for contention transmission, initial transmission with UL grant may be performed. In case of NACK for contention transmission, retransmission with UL grant may be performed (retransmission classification by ID used for content such as HARQ ID, new data indicator (NDI) available). In case of ACK for contention transmission, UL grant may be skipped or new data may be transmitted. In case of no response to contention transmission, collision may be considered and initial transmission may be performed.

4. UL Grant Based Initial PUSCH+No Feedback/Grant Based Retransmission

This approach corresponds initial transmission based on UL grant+grant-free retransmission. The motivation of this approach is that even though it may easily resemble repetition, but retransmission without grant may be performed to reduce retransmission latency. Similar method may be applied to DL. Specifically, initial transmission or retransmission may be indicated by the UL grant. Alternatively, initial transmission may be performed at n+4 subframe according to resource defined by the UL grant, first retransmission may be performed at n+6 subframe, and if ACK does not arrive at n+8, the second retransmission may be performed. Timing may be changed. (Retransmission timing<initial timing).

5. UE Behavior for the Semi-Statically Configured Resource

As described above, the network may schedule the semi-statically configured resource to a UE. The semi-static configuration may be overwritten by dynamic scheduling. In this sense, a UE may be indicated dynamically which resources are available in a subframe. Alternatively, the case may be different per case as follows.

Case 1: In case of FDD, semi-static resource may not be considered when semi-static DL and UL band are assumed.

Case 2: In case of TDD, semi-statically configured UL resource may be punctured or rate matched for DL transmission, regardless of scheduling (in other words, dynamic indication may not override the semi-static configuration)

Case 3: In case of TDD, semi-statically configured DL resource may be punctured or rate matched for UL transmission, which may be overridden by dynamic scheduling.

In terms of semi-static resource, it may not informed to the UEs other than UEs utilizing the resource. In such case, the UE follows scheduling information and resource indication.

Figure 7:
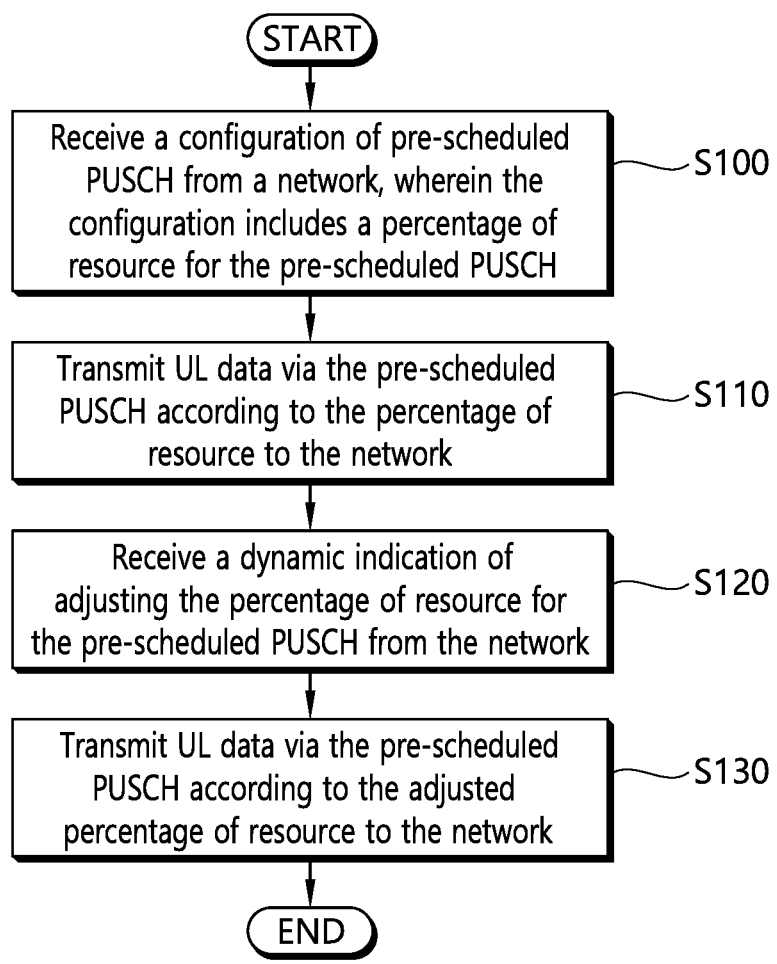
FIG. 7 shows a method for configuring a pre-scheduled PUSCH by a UE according to an embodiment of the present invention.

FIG. 7 shows a method for configuring a pre-scheduled PUSCH by a UE according to an embodiment of the present invention. The present invention described above may be applied to this embodiment.

In step S100, the UE receives a configuration of the pre-scheduled PUSCH from a network, wherein the configuration includes a percentage of resource for the pre-scheduled PUSCH. The configuration may include at least one of an RB allocation, at least one DM-RS sequence for UL data, or at least one MCS. The configuration may be received periodically. The configuration may be received via one of broadcast signaling, group-cast signaling or unicast signaling.

In step S110, the UE transmits UL data via the pre-scheduled PUSCH according to the percentage of resource to the network.

In step S120, the UE receives a dynamic indication of adjusting the percentage of resource for the pre-scheduled PUSCH from the network. The indication may indicate that the percentage of resource for the pre-scheduled PUSCH is decreased, and a highest or lowest PRB may be selected. Or, the indication may indicate that the percentage of resource for the pre-scheduled PUSCH is increased, and an additional resource may be selected after last configured resource for the pre-scheduled PUSCH.

In step S130, the UE transmits UL data via the pre-scheduled PUSCH according to the adjusted percentage of resource to the network.

The UE may perform sensing on the resource for the pre-scheduled PUSCH, and the UL data may be transmitted via the pre-scheduled PUSCH only if the resource for the pre-scheduled PUSCH is free according to the sensing.

Alternatively, the UE may transmit a SR to the network, and receives a confirmation message from the network as a response to the SR. The UL data may be transmitted via the pre-scheduled PUSCH immediately after receiving the confirmation message. The confirmation message may include information on a status of the resource for the pre-scheduled PUSCH. The status of the resource for the pre-scheduled PUSCH may indicate a clean status, which indicates that the network has not scheduled the resource to other UEs, nor the network has not received any request to utilize the resource from other UEs. Or, the status of the resource for the pre-scheduled PUSCH may indicate a dirty status, which indicates that the network has scheduled the resource to other UEs, or the network has received a request to utilize the resource from other UEs. The confirmation message may include information on a desired power for the pre-scheduled PUSCH or a power offset for the pre-scheduled PUSCH. The reception of the confirmation message and the transmission of the UL data may be performed in a same transmission time interval (TTI).

Figure 8:
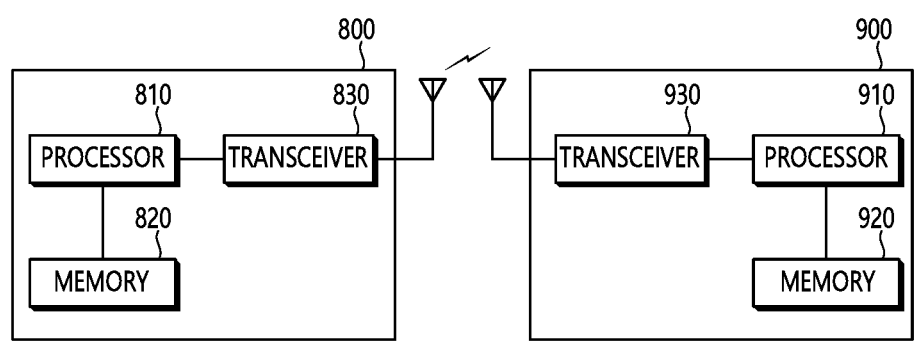
FIG. 8 shows a wireless communication system to implement an embodiment of the present invention.

FIG. 8 shows a wireless communication system to implement an embodiment of the present invention.

A network node 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method for configuring a pre-scheduled physical uplink shared channel (PUSCH) by a user equipment (UE) in a wireless communication system, the method comprising:

receiving a configuration of the pre-scheduled PUSCH from a network, wherein the configuration includes a percentage of resource for the pre-scheduled PUSCH;

transmitting UL data via the pre-scheduled PUSCH according to the percentage of resource to the network;

receiving a dynamic indication of adjusting the percentage of resource for the pre-scheduled PUSCH from the network; and transmitting UL data via the pre-scheduled PUSCH according to the adjusted percentage of resource to the network, wherein the indication indicates that the percentage of resource for the pre-scheduled PUSCH is decreased, and wherein a highest or lowest physical resource block (PRB) is selected.

2. The method of claim 1, wherein the configuration includes at least one of a resource block (RB) allocation, at least one demodulation reference signal (DM-RS) sequence for the UL data, or at least one modulation and coding scheme (MCS).

3. The method of claim 1, wherein the configuration is received periodically.

4. The method of claim 1, wherein the configuration is received via one of broadcast signaling, group-cast signaling or unicast signaling.

5. The method of claim 1,
wherein the indication indicates that the percentage of resource for the pre-scheduled PUSCH is increased, and
wherein an additional resource is selected after last configured resource for the pre-scheduled PUSCH.

6. The method of claim 1, further comprising:
performing sensing on the resource for the pre-scheduled PUSCH, wherein the UL data is transmitted via the pre-scheduled PUSCH only if the resource for the pre-scheduled PUSCH is free according to the sensing.

7. The method of claim 1, further comprising:
transmitting a scheduling request (SR) to the network; and
receiving a confirmation message from the network as a response to the SR, wherein the UL data is transmitted via the pre-scheduled PUSCH immediately after receiving the confirmation message.

8. The method of claim 7, wherein the confirmation message includes information on a status of the resource for the pre-scheduled PUSCH.

9. The method of claim 8, wherein the status of the resource for the pre-scheduled PUSCH indicates a clean status, which indicates that the network has not scheduled the resource to other UEs, nor the network has not received any request to utilize the resource from other UEs.

10. The method of claim 8, wherein the status of the resource for the pre-scheduled PUSCH indicates a dirty status, which indicates that the network has scheduled the resource to other UEs, or the network has received a request to utilize the resource from other UEs.

11. The method of claim 7, wherein the confirmation message includes information on a desired power for the pre-scheduled PUSCH or a power offset for the pre-scheduled PUSCH.

12. The method of claim 7, wherein the reception of the confirmation message and the transmission of the UL data is performed in a same transmission time interval (TTI).

13. A user equipment (UE) in a wireless communication system, the UE comprising:
a memory;
a transceiver; and
a processor, coupled to the memory and the transceiver, that:
controls the transceiver to receive a configuration of a pre-scheduled physical uplink shared channel (PUSCH) from a network, wherein the configuration includes a percentage of resource for the pre-scheduled PUSCH,
controls the transceiver to transmit UL data via the pre-scheduled PUSCH according to the percentage of resource to the network,
controls the transceiver to receive a dynamic indication of adjusting the percentage of resource for the pre-scheduled PUSCH from the network, and
controls the transceiver to transmit UL data via the pre-scheduled PUSCH according to the adjusted percentage of resource to the network,
wherein the indication indicates that the percentage of resource for the pre-scheduled PUSCH is decreased, and
wherein a highest or lowest physical resource block (PRB) is selected.

* * * * *